Oct. 31, 1961 A. R. MAXEY 3,006,218

SPEED CONTROL ARRANGEMENT

Filed March 28, 1960 3 Sheets-Sheet 1

ALEXANDER R. MAXEY
INVENTOR.

BY Harvey G. Lowhurst

ATTORNEY

ALEXANDER R. MAXEY
INVENTOR.
BY Harvey J. Lawhurst
ATTORNEY

ALEXANER R. MAXEY
INVENTOR.

BY

ATTORNEY

United States Patent Office 3,006,218

Patented Oct. 31, 1961

3,006,218

SPEED CONTROL ARRANGEMENT

Alexander R. Maxey, Palo Alto, Calif., assignor to Ampex Corporation, Redwood City, Calif., a corporation of California Filed Mar. 28, 1960, Ser. No. 17,903

11 Claims. (Cl. 74—722)

The present invention relates to a speed control arrangement, and more particularly relates to a speed control arrangement wherein a driver means is coupled by means of belts to a driven means.

In many instances it may be desirable to control or regulate the rotational speed of a driven means. For example, in a magnetic recording and reproducing system such as illustrated and described in U.S. Patent 2,866,012 issued on December 23, 1958, there is shown an arrangement for magnetically recording and reproducing electrical signal intelligence over a wide frequency range such as a television signal. As indicated in said patent, a tape transport is provided for transferring magnetic tape from a supply reel to a take-up reel during the recording or reproducing process. As the tape is driven at a constant speed by a capstan, a rotary magnetic head assembly is caused to rotate at a substantially constant speed, said head assembly includes magnetic transducer units that sweep across the width of the tape. In this example, it is desirable to closely and accurately control or regulate the rotational speed of the magnetic head assembly.

The driven means, i.e. the magnetic head assembly, is therein shown to be coupled to a driver means, i.e. electric motor 23, by a belt 56 which engages pulleys on shafts extending from both the driver means and the driven means. The present invention provides a speed control arrangement including coupling means that may be utilized for closely and accurately controlling the rotational speed of such a driven means.

It is therefore an object of this invention to provide a novel coupling arrangement from a driver means to a driven means.

Another object of this invention is to provide an improved speed regulation system.

Another object of this invention is to provide a highly sensitive and quickly operating speed regulation system.

Still another object of this invention is to provide an improved arrangement coupling a driver means with a driven means wherein the rotational speed of the driven means may be closely and accurately regulated.

A further object of this invention is to provide a coupling arrangement for rotating a driven means with a driver means at a desired rotational speed which may be different from and non-related to the rotational speed of the driver means.

A still further object of this invention is to provide a coupling arrangement between a rotary driver means and a rotary driven means, the rotational speed of the driven means being adjustable to a desired speed by the coupling arrangement without affecting the speed of the driven means.

Another object of this invention is to provide an adjustable speed control arrangement suitable for use in magnetic tape apparatus.

Still another object of this invention is to provide an inexpensive and automatically operating speed regulation system for magnetic tape apparatus.

A further object of this invention is to provide an inexpensive speed regulation system for use in magnetic tape apparatus for recording electrical signals of wide band width such as video signals wherein a high degree of accurate speed control is required.

A still further object of this invention is to provide a mechanical coupling arrangement for rotating a magnetic head assembly with an electric motor, the speed of rotation of magnetic head assembly being automatically regulated to rotate at a desired speed without changing the speed of the electric motor.

Still another object of this invention is to provide a speed regulation arrangement for a rotary driven means, wherein the driven means is constantly urged in opposite directions by substantial forces in order to maintain a firm and stable control of the speed of the driven means.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figures 1, 3:
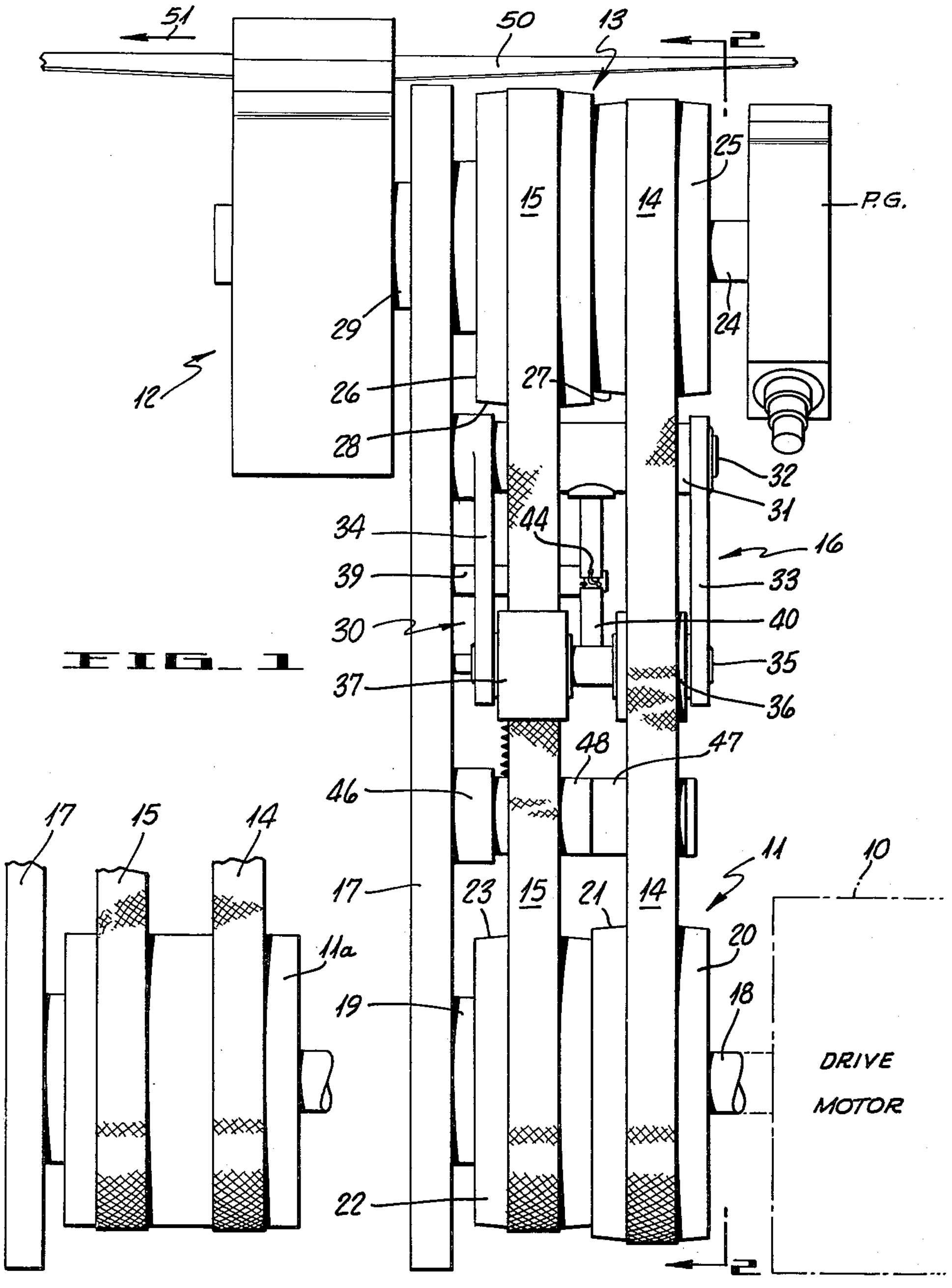
FIGURE 1 shows a side view of a tape transport showing a speed control arrangement of this invention.
FIGURE 3 shows a side view of a belt driving member which is an alternate to that seen in FIGURE 1.
Figure 2:
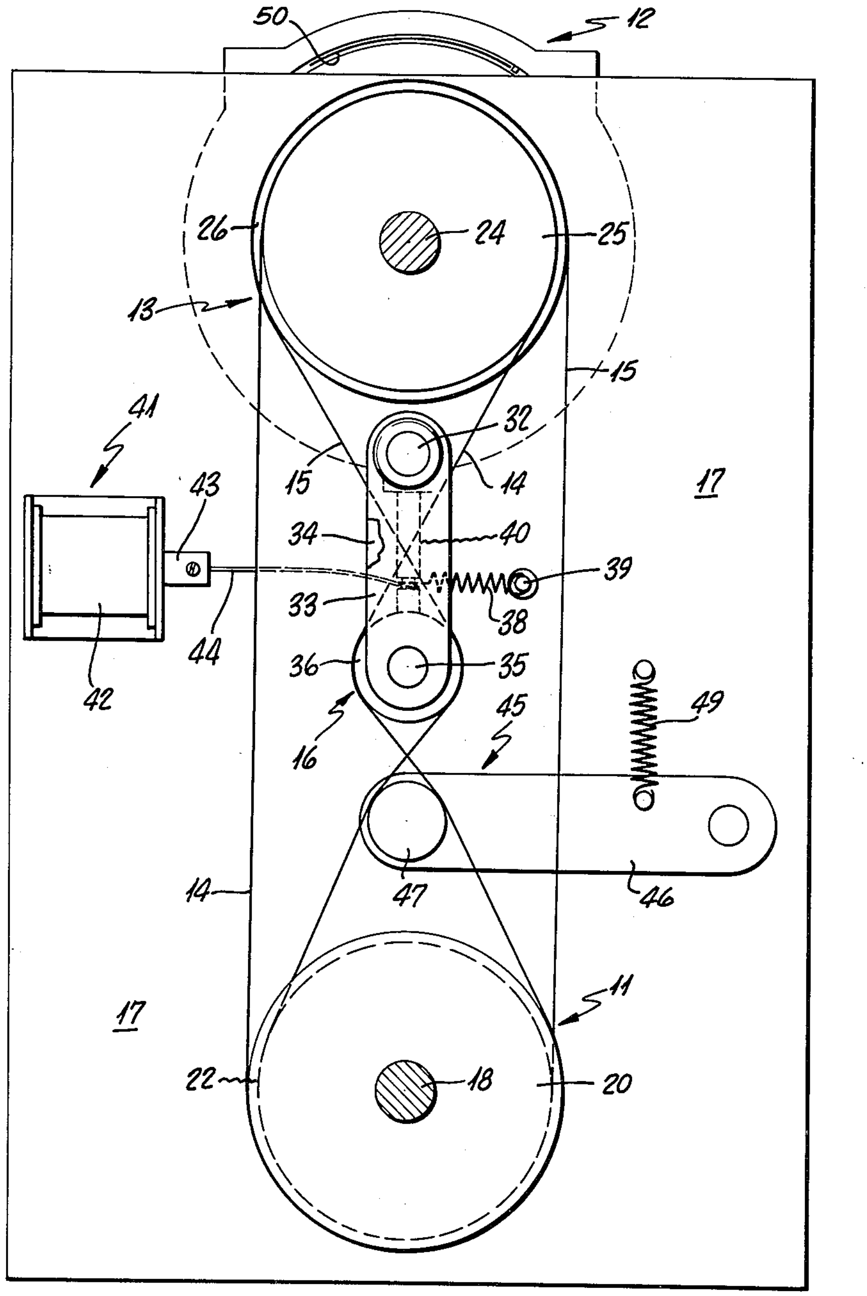
FIGURE 2 shows a rear view of the tape transport as seen along lines 2—2 of FIGURE 1.

Referring now to the drawings, there is shown in FIGURES 1 and 2 one embodiment of the invention comprising a driver means including an electric motor 10 (shown in dotted lines) for rotating a belt driving member 11, a driven means including a load such as a magnetic head assembly 12 connected to rotate with belt driven member 13, a pair of endless flat belts 14 and 15 connecting said members, and belt adjusting means generally designated as 16, all being supportably mounted on plate 17.

Electric motor 10 and member 11 connected as hereinafter described constitute the driver means for belts 14 and 15. Electric motor 10 is suitably supported and has a shaft 18 rotatively journaled in bushing 19 which is secured to plate 17. Member 11 is carried by and connected to rotate with shaft 18 by any common means known in the art such as by the use of key fasteners, bolts, pins or the like. Member 11 has a first cylindrical section 20 with a first annular surface 21 which may be rounded as seen in FIGURE 1 to form in effect a crowned pulley. Accordingly, a belt when being driven thereon will then climb to the center of annular surface 21 since this center has the largest diameter. Of course, it will be realized that instead of rounding annular surface 21 as seen in FIGURE 2, side guides for belt 14 may be provided, if required, to prevent belt 14 from shifting free of annular surface 21. Member 11 also has a second cylindrical section 22 with a second annular surface 23 having a diameter slightly smaller than that of cylindrical section 20, but otherwise similar.

The driven means includes belt driven member 13 rotatively connected by shaft 24 to magnetic head assembly 12 and pulse generating means P.G., said head assembly and pulse generating means being described in U.S. Patent No. 2,866,012. Member 13 is similar to member 11 and has a pair of first and second cylindrical sections 25 and 26 having first and second annular surfaces 27 and 28, respectively, said surfaces are also slightly rounded as seen in FIGURE 1. Cylindrical section 25 has a slightly smaller diameter than cylindrical section 26. Shaft 24 extends through bearing 29 in plate 17 to support member 13, head assembly 12, and said pulse generating means P.G.

Belt adjusting means 16 includes a yoke 30 having a hub 31 which is connected to pivot on shaft 32 fixedly supported by plate 17. Arms 33 and 34 extend from opposite ends of hub 31 to support a shaft 35 on which rollers 36 and 37 freely and independently rotate. On one side of yoke 30, helical spring 38 has one end fixedly connected to support 39 on plate 17 and has its other end connected to a connecting rod 40 radially extending between hub 31 and shaft 35. On the other side of yoke 30, a solenoid 41 including a coil 42 and a core or plunger 43 is connected to pivot yoke 30 on shaft 32 by means of a stiff wire 44 connecting core 43 to connecting rod 40.

The driver means is coupled to the driven means by flat endless belts 14 and 15. Belt 14 rides on first annular surfaces 21 and 27 of cylindrical sections 20 and 25, respectively. Belt 15 rides on second annular surfaces 23 and 28 of cylindrical sections 22 and 26, respectively. As seen in FIGURE 2, one side of endless belt 14 between members 11 and 13 is disposed inwardly toward the other side of belt 14 to turn about and engage roller 36 on the side of said roller closest to said other side of said belt. Similarly, one side of belt 15 (opposite of said one side of belt 14) between members 11 and 13 is disposed inwardly toward the other side of belt 15 to turn about and engage roller 37. A tension take-up arm 45 has a flat member 46 having one end pivotly connected to plate 17 and has a pair of freely rotating rollers 47 and 48 on its other end which engage belts 14 and 15 below the cross-over point of said belts under yoke 30 as seen in FIGURE 2. A helical spring 49 provides spring bias for tension take-up arm 45 to urge rollers 47 and 48 against belts 14 and 15 respectively in order to take up any slack in the belts.

In operation, electric motor 10 upon being suitably energized will rotate belt drive member 11 to drive belts 14 and 15. The frictional forces of belts 14 and 15 will urge rotation of belt driven member 13 at different non-slip speeds depending upon the ratio of cylindrical section 25 to section 20 and that of cylindrical section 26 to section 22, respectively. Cylindrical sections 25 and 26 as well as cylindrical sections 20 and 22 are integrally connected and cannot rotate at different rotational speeds. If the tension in one of the belts is much greater than that in the other belt then the frictional force of this belt may cause rotation of the driven member at its said non-slip speed, the other belt slipping at a rate so that it is ineffective to control the rotational speed of the driven member. However, if the difference in the tensions in the belts is not too great then both belts will slip and driven member 13 will be rotated at a speed between the said non-slip speeds urged by each belt. Accordingly, the rate of slippage in each belt depends upon the relative tension of the belts creating the frictional force urging the rotation of driven member 13 at different speeds. Varying the tension of one or the other belt will thereupon vary the speed of driven member 13. Transducer units of magnetic head assembly 12 will be rotated by driven member 13 to sweep across the width of tape 50 that moves in the direction of arrow 51.

The tension in the belts is varied by belt adjusting means 16 which includes yoke 30 urged by spring 38 to the right as seen in FIGURE 2, and urged to the left when coil 42 of solenoid 41 is energized (by a suitable voltage source) to move core 43 within coil 42. If the energizing voltage applied to coil 42 is varied then the position of yoke 30 will be changed. If yoke 30 is pivoted to the left as seen in FIGURE 2, roller 36 will bear more heavily against belt 14 to increase the tension therein, and roller 37 will bear less heavily against belt 15 decreasing the tension therein. The speed of driven member 13 will therefore depend upon the energizing voltage applied to coil 42 of solenoid 41. Accordingly, it will be realized that the speed of the driven member 13 can be varied between said non-slip speeds when the tension in belts 14 and 15 is changed by pivoting yoke 30 as above described.

Figures 4, 5:
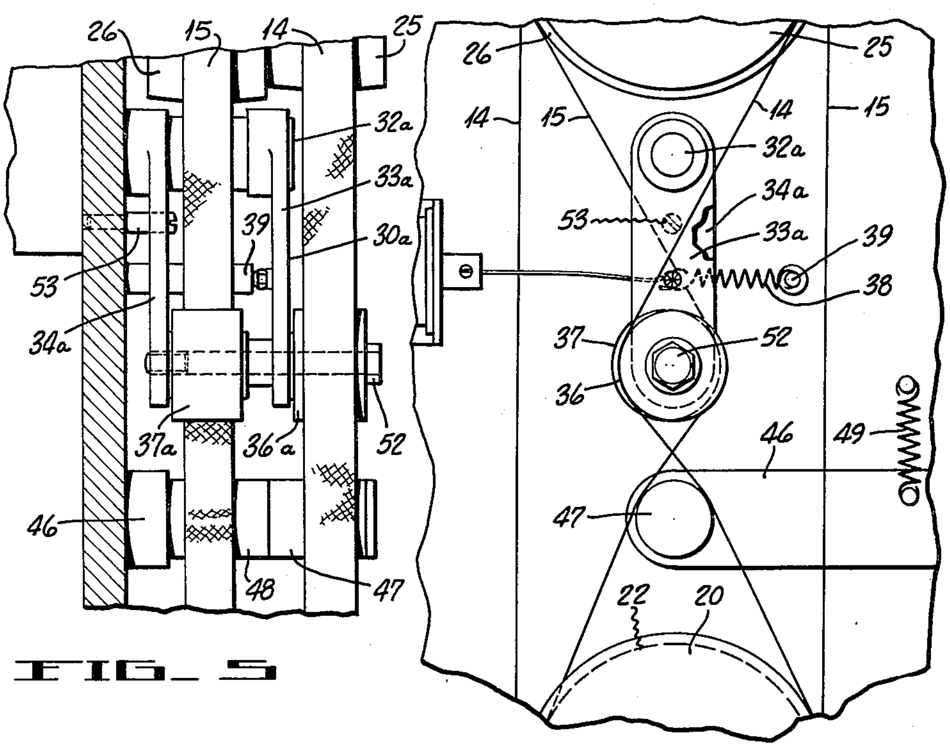
FIGURE 4 shows a partial rear view of a tape transport showing a speed control arrangement having a belt adjusting means which is an alternate to that seen in FIGURE 2.
FIGURE 5 shows a side view of the belt adjusting means seen in FIGURE 4.

Instead of both the belt driving member 11 and belt driven member 13 having cylindrical sections of different diameters, it will be appreciated that only one of these members may have different diameters. For example, in FIGURE 3 there is seen a belt driving member comprising a single cylindrical section **11*a* that may be used instead of belt driving member 11 of FIGURES 1 and 2. Furthermore, instead of yoke 30 simultaneously moving two rollers 36 and 37 on a single shaft 35, a yoke 30*a* may be provided as seen in FIGURES 4 and 5. Yoke 30*a* has arms 33*a* and 34*a* each of which may independently pivot on shaft 32. Removable bolt 52 is seen to interconnect arms 33*a* and 34*a* so that rollers 36*a* and 37*a* will be simultaneously moved as in the embodiment of FIGURES 1 and 2. On the other hand, if bolt 52 is removed and arm 34*a* is fixedly secured to plate 17 by removable screw 53 then only arm 33*a* will be pivoted; thereby only the tension in belt 14** will be varied. Other similar changes in the construction of a speed control arrangement in accordance with this invention will be obvious from the above description.

Figure 6:
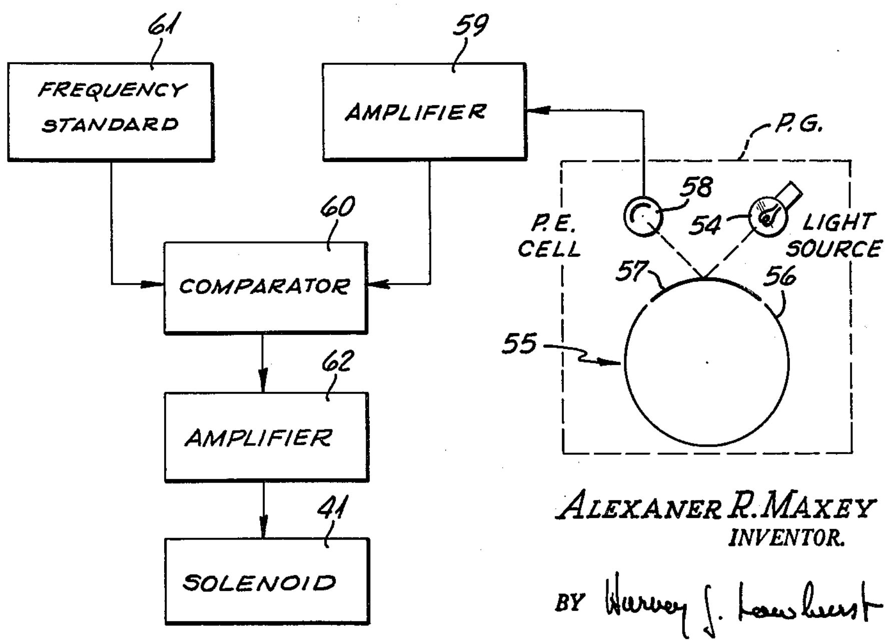
FIGURE 6 shows a schematic block diagram of a speed sensing system that may be used with the shown embodiments of this invention for regulating the speed of a driven means.

For certain applications, it may be desirable to control the speed of the driven member within narrow limits and in accordance with a standard reference, i.e. to regulate the speed thereof. In FIGURE 6 there is shown a schematic bloc diagram of a speed sensing system that may be used with the embodiments of this invention for regulating the speed of the driven means in accordance with a predetermined rate. Pulse generating means P.G. is shown schematically to comprise a light source 54 directing a ray of light on rotating member 55 having a non-reflecting surface 56 and a reflecting surface 57. The ray of light reflects from reflecting surface 57 to be picked up by photoelectric cell 58 in order to produce pulses having a frequency representative of the speed of the driven means. The pulses from pulse generating means are applied to amplifier 59 and thence to comparator 60. Standard signal generator 61 supplies a signal of a predetermined frequency to comparator 60 which in turn produces a correction or control signal that is representative of the difference between the frequency of the signal from pulse generating means P.G. and standard signal generator 61, said correction signal is then suitably amplified by amplifier 62 to produce an energizing voltage which is applied to coil 42 of solenoid 41. The magnitude of the energizing voltage applied to coil 42 depends upon the difference in frequency of the signals from pulse generating means P.G. and standard signal generator 61. If the speed of electric motor 10 varies, the frequency of the signal from pulse generating means P.G. will then correspondingly vary. The resulting correction signal, after being amplified by amplifier 62, will energize coil 42 to move belt adjusting means 16 to compensate for the speed variance of electric motor 10. The tension in belts 14 and 15 will be changed so that the rate of rotation of belt driven member 13 will not be changed, but will correspond to frequency standard 61. Accordingly, it will be realized that the rate of rotational speed of a driven member 13 is regulated to a predetermined rate.

What is claimed is:

1. A speed control arrangement between a driver means and a driven means comprising: a first belt directly connecting the driver means with the driven means and urging rotation of the driven means at a first non-slip speed; a second belt directly connected to the driver means and the driven means and urging rotation of the driven means at a second non-slip speed, each of said belts slipping with respect to said means to rotate said driven means at a speed intermediate the first and second non-slip speeds, and means for varying the slippage of said belts to control the speed of said driven means.

2. A speed control arrangement comprising: a driver means including a belt driving member; a driven means including a belt driven member; a first endless belt directly connecting said belt driving member and said belt driven member and urging rotation of said driven means at a first non-slip speed; a second endless belt directly connecting said belt driving member and said belt driven member and urging rotation of said driven means at a second non-slip speed, each of said belts slipping with respect to said members to rotate said driven means at a speed intermediate said first and second non-slip speeds, and means for varying the slippage of said belts to control the speed of said driven means.

3. A speed control arrangement comprising: a driver means including a belt driving member having a pair of annular surfaces of different diameters; a driven means including a belt driven member having a pair of annular surfaces of different diameters; a first belt connecting annular surfaces of said belt driving member and said belt driven member and urging rotation of said driven means at a first non-slip speed; a second belt connecting annular surfaces of said belt driving member and said belt driven member and urging rotation of said driven means at a second non-slip speed, each of said belts slipping to rotate said driven means at a speed intermediate the first and second non-slip speeds, and means for varying the slippage of said belts to control the speed of said driven means.

4. A speed control arrangement comprising: a driver means including a belt driving member having a plurality of annular surfaces; a driven means including a belt driven member having a plurality of annular surfaces; a plurality of belts connecting annular surfaces of said belt driving member and said belt driven member and urging rotation of said driven means at a plurality of non-slip speeds, each of said belts slipping to rotate said driven means at a speed intermediate the plurality of non-slip speeds, and means for varying the slippage of said belts to control the speed of said driven means.

5. A speed regulating arrangement comprising: a driver means including a belt driving member; a driven means including a belt driven member; a first belt directly connecting said driving member with said driven member to urge rotation of said driven member at a first non-slip speed; a second belt directly connecting said driver member with said driven member to urge rotation of said driven member at a second non-slip speed, each of said belts slipping with respect to said members to rotate said driven member at a speed intermediate the first and second non-slip speeds; and means to adjust the tension of at least one of said belts to vary the amount of its slippage and thereby vary the rotational speed of said driven member.

6. An adjustable speed regulating arrangement comprising: a driver means including a belt driving member having a pair of annular surfaces of different diameters; a driven means including a belt driven member having a pair of annular surfaces of different diameters; a pair of flat endless belts connecting annular surfaces of said belt driving member and said belt driven member to urge rotation of said belt driven member at different non-slip speeds, each of said belts slipping to rotate said driven means at a speed intermediate said non-slip speeds; and means to adjust the tension of at least one of said belts to vary the amount of its slippage and thereby vary the rotational speed of said driven means.

7. A speed regulating arrangement comprising: a driver means including a motor rigidly coupled to a belt driving member; a driven means including a rotatable load rigidly coupled to a belt driven member, a first belt directly connecting said belt driving member to said belt driven member to urge rotation of said driven means at a first non-slip speed; a second belt directly connecting said belt driving member to said belt driven member to urge rotation of said driven means at a second non-slip speed, each of said belts slipping with respect to said members to rotate said driven means at a speed intermediate said non-slip speeds; and means to increase the tension in one of said belts and to simultaneously decrease the tension in the other of said belts to vary the amount of slippage in said belts and thereby vary the rotational speed of said driven means.

8. A speed regulating arrangement comprising: a driver means including a motor with a belt driving member having a first and a second annular surface; a driven means including a rotatable load with a belt driven member having a first and a second annular surface; a first flat endless belt connecting an annular surface of said belt driving member to an annular surface of said belt driven member to urge rotation of said driven means at a first non-slip speed; a second flat endless belt connecting an annular surface of said belt driving member to an annular surface of said belt driven member to urge rotation of said driven means at a second non-slip speed, each of said belts capable of slipping to rotate said driven means at a speed intermediate said non-slip speeds; and means to increase the tension in one of said belts and to simultaneously decrease the tension in the other of said belts to vary the amount of slippage in said belts and thereby vary the rotational speed of said driven means.

9. A speed regulating arrangement comprising: a driver means having a first and a second annular surface; a driven means having a first and a second annular surface; a pair of belts, each belt connecting one of the annular surfaces of the said driver means with one of the annular surfaces of said driven means to rotate said driven means with said driver means, each belt slipping on at least one of said annular surfaces; a speed control sensing device including a first signal source for supplying a reference signal, a second signal source connected to said driven means for supplying a signal representative of the speed thereof, and a detector connected to said first and said second signal sources to derive a control signal in accordance with the difference between the signals from said signal sources; and belt tension adjusting means connected to the detector to vary the tension in at least one of said belts to regulate the amount of its slippage in accordance with the control signal and thereby regulate the rotational speed of said driven means.

10. A speed regulating arrangement comprising: a driver means having a first and a second annular surface; a driven means having a first and a second annular surface; a pair of belts, each belt connecting one of the annular surfaces of the said driver means with one of the annular surfaces of said driven means to rotate said driven means with said driver means, each belt slipping on said annular surfaces; a speed control sensing device including a first signal source for supplying a reference signal, a second signal source connected to said driven means for supplying a signal representative of the speed thereof, and a detector connected to said first and said second signal sources to derive a control signal in accordance with the difference between the signals from said signal sources; and belt adjusting means connected to the detector to vary the tension in said belts to regulate the amount of slippage in accordance with the magnitude of said control signal and thereby regulate the rotational speed of said driven means.

11. A speed regulating arrangement comprising: a driver means including a motor with a belt driving member having a first and a second annular surface; a driven means including a rotatable load with a belt driven member having a first and a second annular surface, a first flat endless belt connecting an annular surface of said belt driving member to an annular surface of said belt driven member to urge rotation of said driven means at a first non-slip speed; a second flat endless belt connecting an annular surface of said belt driving member to an annular surface of said belt driven member to urge rotation of said driven means at a second non-slip speed, each of said belts slipping to rotate said driven means at a speed intermediate said non-slip speeds; belt adjusting means including a pair of independent freely rotatable rollers, opposite sides of each belt between said driver and driving members being disposed inwardly toward the other side of said belt and around each roller respectively, a belt tension means to urge said rollers in one direction, and another belt tension means to urge said rollers in an opposite direction; and a speed control sensing device including a first signal source for supplying a reference signal, a second signal source connected to said driven means for supplying a signal representative of the speed thereof, and a detector connected to said first and said second signal sources to derive a control signal in accordance with the difference between the signals from said signal sources, one of said belt tension means being connected to said detector and being responsive to said control voltage to vary the tension in said belts for regulating the amount of belt slippage in accordance with the magnitude of said control signal and thereby regulate the rotational speed of said driven means.

References Cited in the file of this patent

UNITED STATES PATENTS

| | | |
|---|---|---|
| 2,499,128 | Brunken | Feb. 28, 1950 |
| 2,884,810 | Chapman | May 5, 1959 |
| 2,886,977 | Van Ausdall | May 19, 1959 |